United States Patent
Bakshi et al.

(10) Patent No.: US 11,681,609 B1
(45) Date of Patent: Jun. 20, 2023

(54) IDENTIFYING FEATURE MODIFICATION IN SOFTWARE BUILDS USING BASELINE DATA

(71) Applicant: Webomates Inc., Stamford, CT (US)

(72) Inventors: Aseem Bakshi, Darien, CT (US); Arvind Ramdas Mallya, Walnut Creek, CA (US); Preeti Gupta, Delhi (IN); Ruchika Gupta, Norwalk, CT (US)

(73) Assignee: WEBOMATES INC., Stamford, CT (US)

( * ) Notice: Subject to any disclaimer, the term of this patent is extended or adjusted under 35 U.S.C. 154(b) by 0 days.

(21) Appl. No.: 18/094,142

(22) Filed: Jan. 6, 2023

(51) Int. Cl.
    *G06F 11/36* (2006.01)
(52) U.S. Cl.
    CPC ...... *G06F 11/3688* (2013.01); *G06F 11/3684* (2013.01); *G06F 11/3692* (2013.01)
(58) Field of Classification Search
    None
    See application file for complete search history.

(56) References Cited

U.S. PATENT DOCUMENTS

| 9,928,161 | B1 * | 3/2018 | Costello | G06F 11/3684 |
| 10,204,092 | B2 * | 2/2019 | Venkataraman | G06F 40/174 |
| 2005/0071818 | A1 * | 3/2005 | Reissman | G06F 11/3672 717/127 |
| 2018/0107580 | A1 * | 4/2018 | Zhang | G06V 30/40 |
| 2019/0294531 | A1 * | 9/2019 | Avisror | G06F 11/3684 |
| 2020/0034282 | A1 * | 1/2020 | He | G06F 11/3688 |
| 2022/0342663 | A1 * | 10/2022 | Barkaee | G06F 8/77 |

OTHER PUBLICATIONS

Hosek, "Safe Software Updates via Multi-version Execution", 2013, IEEE (Year: 2013).*

* cited by examiner

*Primary Examiner* — Hossain M Morshed
(74) *Attorney, Agent, or Firm* — Shumaker, Loop & Kenderick, LLP

(57) ABSTRACT

A system and a method for automatically testing software builds. The system includes testing a first software build using a test package. The test package includes at least a test strategy, a test case, a test model, an automation test script, a crowdsource script, and a manual test script. Further, baseline data is generated based upon a successful execution of the test package on the first software build. Further, a second software build is tested using the test package. Subsequently, the target data is generated based upon an execution of the test package on the second software build. The system then identifies a change in the second software build by comparing the target data with the baseline data. Further, a modification is recommended to the test package for the second software build using Artificial Intelligence (AI) techniques and Natural Language Processing (NLP).

15 Claims, 4 Drawing Sheets

IDENTIFYING FEATURE MODIFICATION IN SOFTWARE BUILDS USING BASELINE DATA

PRIORITY INFORMATION

The present application does not claim priority from any other application.

TECHNICAL FIELD

The present subject matter described herein, in general, relates to automation of software testing and, more particularly, to a system and a method for automatically testing software builds.

BACKGROUND

Testing is an integral part of the software development process. Generally, a software is launched after performing a series of testing on each functionality of the software. To perform the testing, a tester may create a set of test cases to validate each functionality of the software. Further, the testing may be carried out using a manual testing framework or an automated testing framework. A developer creates the software that is then given to a tester to validate whether the software is working properly. In order to validate the software, the developer creates test cases and automation test scripts. When the developer updates/modifies the software, the test cases and the automated test scripts are impacted. Therefore, there is a need to identify the impacted test cases. Currently, identification of the impacted test cases relies solely on manual skills which is error prone.

SUMMARY

Before the present system(s) and method(s) are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for automatically testing software builds. This summary is not intended to identify essential features of the claimed subject matter, nor is it intended for use in determining or limiting the scope of the claimed subject matter.

In one implementation, a method for automatically testing software builds is disclosed. The method comprises testing a first software build using a test package. The test package may comprise at least a test strategy, a test case, a test model, an automation test script, a crowdsource script, and a manual test script. Further, baseline data may be generated based upon a successful execution of the test package on the first software build. The baseline data may be generated when the test package is executed for action steps of the first software build. The baseline data may comprise, but not limited to, one or more screenshots, Uniform Resource Locators (URLs), test steps, test validation points, test summary, locators, console logs, Hypertext Markup Language (HTML) code, and automation logs. Further, a second (next) software build is tested using the same test package. Subsequently, target data may be generated based upon an execution of the test package on the second (next) software build. The target data may be generated when the test package is executed for action steps of the second software build. The target data may comprise, but not limited to, one or more screenshots, Uniform Resource Locators (URLs), test steps, test validation points, test summary, locators, console logs, Hypertext Markup Language (HTML) code, and automation logs obtained post execution of the second software build. Further, a change in the second software build may be identified by comparing the target data with the baseline data. The change may be identified when the target data and the baseline data mismatch. Further, a modification to the test package for the second software build may be recommended. The modification may comprise at least adding a new test case and an associated new automation test script, updating the test case and the automation script, regenerating a modified test package as a result of the feature change, and removing one or more test cases and associated automation scripts from the test package based on the identified change. In one aspect, the aforementioned method for automatically testing software builds may be performed by a processor using programmed instructions stored in a memory.

In another implementation, a non-transitory computer readable medium embodying a program executable in a computing device for automatically testing software builds is disclosed. The program may comprise a program code for testing a first software build using a test package. The test package may comprise at least a test strategy, a test case, a test model, an automation test script, a crowdsource script, and a manual test script. Further, the program may comprise a program code for generating baseline data based upon a successful execution of the test package on the first software build. The baseline data may be generated when the test package is executed for action steps of the first software build. The baseline data may comprise, but not limited to, one or more screenshots, Uniform Resource Locators (URLs), test steps, test validation points, test summary, locators, console logs, Hypertext Markup Language (HTML) code, and automation logs. Subsequently, the program may comprise a program code for testing a second software build using the test package. Further, the program may comprise a program code for generating target data based upon an execution of the test package on the second software build. The target data may be generated when the test package is executed for action steps of the second software build. The target data may comprise, but not limited to, one or more screenshots, Uniform Resource Locators (URLs), test steps, test validation points, test summary, locators, console logs, Hypertext Markup Language (HTML) code, and automation logs. Further, the program may comprise a program code for identifying a change in the second software build by comparing the target data with the baseline data. The change may be identified when the target data and the baseline data mismatch. Finally, the program may comprise a program code for recommending a modification to the test package for the second software build. The modification may comprise at least adding a new test case and an associated new automation test script, updating the test case and the automation script, regenerating a modified test package as a result of the feature change, and removing one or more test cases and associated automation scripts from the test package based on the identified change.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific method and system for automatically testing software builds disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
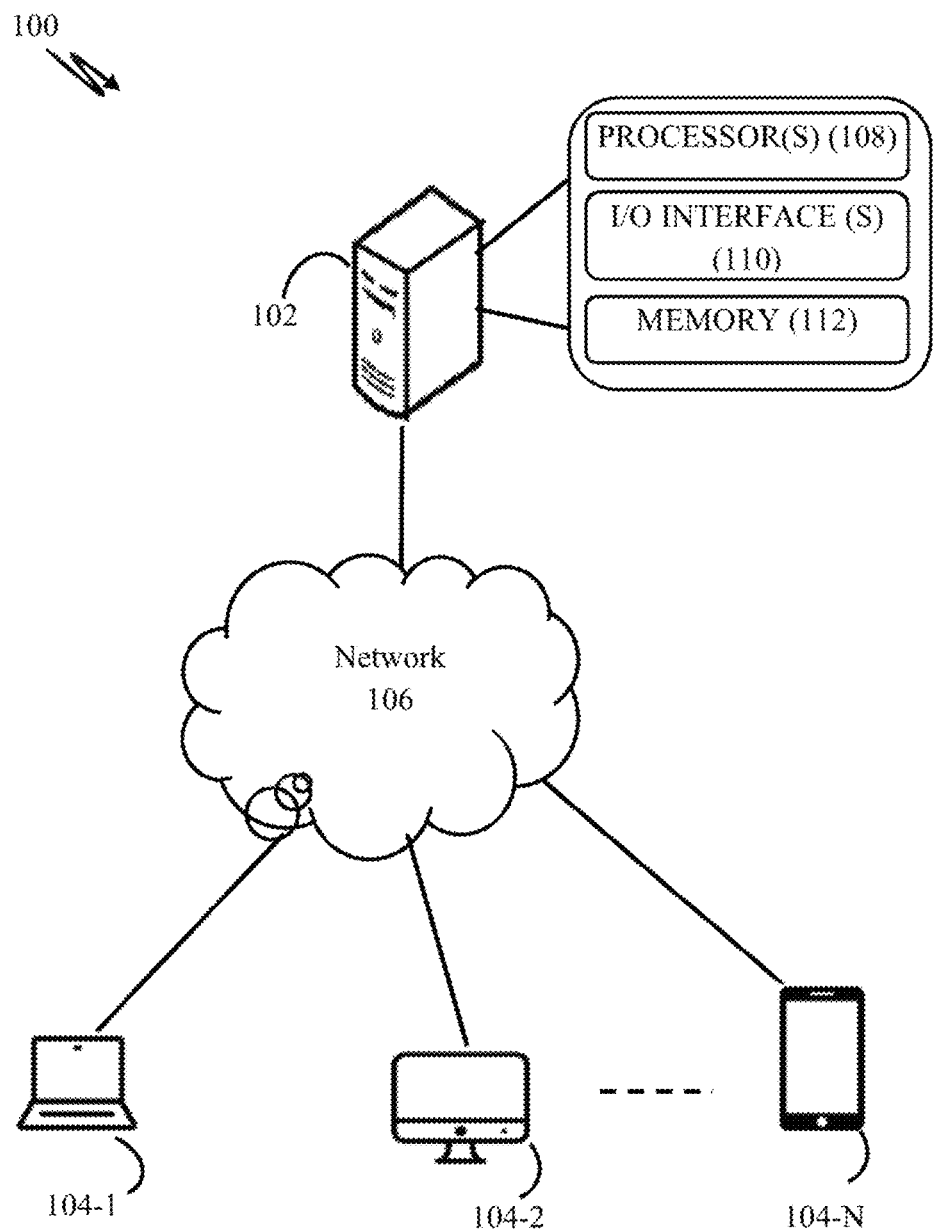
FIG. 1 illustrates a network implementation for automatically testing software builds, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "testing," "generating," "identifying," "recommending," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for automatically testing software builds. The testing of the application builds, or software builds comprises processes that include data generation, data comparison, and recommendations related to the modification of test cases and associated automation test scripts. Initially, a software build from the developers is tested using a test package to confirm successful testing of the software build, i.e., the first software build. The test package comprises at least a test strategy, a test case, a test model, an automation test script, a crowdsource script, and a manual test script.

Further, the second software build is tested using the same test package. It may be noted that the second software build is an updated or modified version of the first software build. The updates in the second software build may be related to a change in the feature of the software, an addition of a new feature, a bug, and a change in the configuration of the software build.

In the data generation, baseline data and target data are generated from the first and second software build, respectively. It should be noted that the data generation is active at every step of the software testing. Specifically, the baseline data is generated when the test package is executed for action steps of a first/initial software build, and the target data is generated when the test package is executed for action steps of a second/next software build. It should be noted that the baseline data may comprise, but not limited to, one or more screenshots, Uniform Resource Locators (URLs), test steps, test validation points, test summary, locators, console logs, Hypertext Markup Language (HTML) code, and automation logs. The baseline data is obtained for the happy day (ideal) scenario meaning that no error occurred while testing the software build. It should be noted that the target data may comprise, but not limited to, one or more screenshots, Uniform Resource Locators (URLs), test steps, test validation points, test summary, locators, console logs, Hypertext Markup Language (HTML) code, and automation logs obtained by executing the second/next software build. Further, the baseline data and the target data are generated for each action step of the respective first and second software build.

In general, during software testing, an ideal scenario is compared with a failing/differential test scenario in order to identify differential elements/mismatches in updated software builds. During data comparison, the target data is compared with the baseline data to identify changes or mismatches, or errors in the second software build. The baseline data is related to the ideal scenario, and the target data is related to the failing/differential test scenario. The data comparison is performed using at least Machine Learning Algorithms, and Artificial Intelligence (AI) techniques. Results of the data comparison or the changes identified in the second software build are utilized for recommending appropriate modifications to the test package. The recommendation is provided to the user through the graphical user interface (GUI) or I/O interface. While aspects of the present invention described for automatically testing software builds may be implemented in any number of different computing systems, environments, and/or configurations, the embodiments are described in the context of the following exemplary system.

Referring now to FIG. 1, a network implementation 100 of a system 102 for automatically testing software builds is disclosed. Initially, the system 102 receives a first software build and a test package. In an example, the software may be installed on a user device 104-1. It may be noted that the one or more users may access the system 102 through one or more user devices 104-1, 104-2, . . . 104-N, collectively referred to as user devices 104, hereinafter, or applications residing on the user devices 104. The system 102 may receive a first software build and a test package from one or more user devices 104. Further, the system may also 102 receive a feedback related to recommended modifications to the test package from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for automatically testing software builds. At first, a user may use the user device 104 to access the system 102 via the U/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for automatically testing software builds. The system 102 may comprise testing a first software build using a test package. The test package may comprise at least a test strategy, a test case, a test model, an automation test script, a crowdsource script, and a manual test script. The system may receive the first software build by a user (a developer or a tester).

Further to testing the first software build, the system 102 may generate baseline data based upon a successful execution of the test package on the first software build. It may be noted that the baseline data is generated when the test package is executed for action steps of the first software build. The baseline data may comprise, but not limited to, one or more screenshots, Uniform Resource Locators (URLs), test steps, test validation points, test summary, locators, console logs, Hypertext Markup Language (HTML) code, and automation logs. It may be noted that the system captures the screenshot whenever a change is detected on a display. In an alternate embodiment, the system may also capture a video snippet depicting the change on the display (or UI). In yet another embodiment, when a URL change is detected, the system captures the URL and takes a screenshot.

Further to generating the baseline data, the system may test a second software build using the test package. It may be noted that the second software build is a modified version of the first software build. Further, the second software build is tested on the same test package as of the first software build.

Further, the system 102 may generate target data based upon an execution of the test package on the second software build. The target data may be generated when the test package is executed for action steps of the second software build. The target data may comprise, but not limited to, one or more screenshots, Uniform Resource Locators (URLs), test steps, test validation points, test summary, locators, console logs, Hypertext Markup Language (HTML) code, and automation logs. The target data may be generated when the test package execution fails for the second software build.

In an embodiment, the execution of the second software build may be paused when at least a test case or associated automation scripts fails. In yet another embodiment, the system continues to execute the complete test package even when the system detects a failure in at least a test case.

Further, the system 102 may identify a change in the second software build by comparing the target data with the baseline data. The change may be identified when the target data and the baseline data mismatch.

It may be noted that the system compares the one or more screenshots captured during the execution of the test package on the first software build with the one or more screenshots captured during the execution of the test package on the second software. The comparison of the screenshots is performed using Artificial Intelligence (AI) enabled image processing techniques and neural network models. The AI-enabled image processing techniques may comprise but are not limited to YOLO® (You Only Look Once), text analytics, OCR®, Keras®, and TensorFlow® techniques.

Furthermore, the generated target data with respect to screenshots or images are compared with the screenshots of the baseline data. In other words, the screenshots of both target data and baseline data for the respective step are compared to identify the feature change or differential features. The comparison is performed using Machine Learning (ML) algorithms and Artificial intelligence (AI)-enabled image processing tool. If the differential features or mismatches are identified, then status of the respective step is marked with a specific mismatch identification (i.e. attribute changed when compared to baseline data). Otherwise, the respective step is validated as unchanged.

Similarly, the system also compares the locators of the first software build with the locators of the second software build to identify a change in one or more locators of the second software build using AI-enabled tracing tools.

Further, the console logs of the first software build are compared with the console logs of the second software build to identify a change in one or more console logs of the second software build. The change is identified using Natural Language Processing (NLP) techniques such as Euclidean Distance, Cosine Similarities, and AI techniques such as, but not limited to, Text Mining. Furthermore, the automation logs of the first software build may be compared with the automation logs of the second software build to identify a change in the automation logs of the second software build using the NLP techniques.

Similarly, the system compares the URLs, test steps, test validation points, and test summary of the first software build with the corresponding URLs, test steps, test validation points, and test summary obtained by executing the second software build to identify the changes. It may be noted that changes are identified using Natural Language Processing (NLP) techniques.

Consider an example, let's assume that the test package comprises ten test cases. Further, ten automation scripts associated with the ten cases are created. Further, the first software build is tested using the ten automation scripts. Further, let's assume that there are 10 action points in each automation script. The action step is a step in the automation script where input from a user is sent to the system. Some examples are "click on submit button," "click on edit button to enter text, and hit submit button." Hence in the example, there would be 100 elements (or attributes) captured by the system. It may be noted that the system captures the screenshot, the HTML code, the automation logs, the console logs, and the locators at each action step. It may be noted that data captured post successful execution of the first software build is called baseline data.

Further, the system receives a second (or new) software build for testing. Let us assume that while testing the second software build, the first automation script fails in action step 3. Further, the system compares the data obtained post-execution of action step 3 with the baseline data.

First Software Build→Test Cycle 2→Test Case 1→Action Step 3→Baseline Data

Second Software Build→Test Cycle 2→Test Case 1→Action Step 3→Captured Data (Target Data)

In the above example, the system compares the data obtained while executing the first and second software build at action step 3. In an alternate embodiment, the system may also compare the data obtained at earlier action steps (action steps 1 and 2), when the action steps are related to each other. Consider an example, action step 1 is "Click on the edit button", action step 2 is "enter the text", and action step 3 is "save the file." In the example, actions steps 1-3 are related, and thus, the system may compare the data obtained at earlier action steps with the baseline data. A relation identification model can be used to determine action-step relationships. The relation identification is an ML model.

After identifying the change in the second software build, the system may recommend a modification to the test package for the second software build. The modification may comprise at least adding a new test case and an associated new automation test script, updating the test case and the automation script, regenerating a modified test package as a result of the feature change, and removing one or more test cases and associated automation scripts from the test package based on the identified change. The modification to the test package may be recommended using Artificial Intelligence (AI) techniques and Natural Language Processing (NLP).

In the above example, the system may compare the target data with the baseline data for each action step of the second software build and the first software build by comparing locators and HTML code of each of the first software build and each of the second software build to identify a change in the second software build.

Compare:
Test Cycle 1→Test Case 1→Action Step 3→baseline data (locator)
Test Cycle 1→Test Case 1→Action Step 3→baseline data (HTML code)
With:
Test Cycle 2→Test Case 1→Action Step 3→target data (locator)
Test Cycle 2→Test Case 1→Action Step 3→target data (HTML code)

In some embodiments, the system may identify a timeout error when the locators present in the first and second software builds are identical. For instance, if the locators are identical, then data execution may be failed due to a timeout problem.

In yet another embodiment, when the locators present in the first and second software builds are not identical, the system generate a new locator for the second software build. The new locator is generated by identifying a difference between the first software build's HTML code with the second software build's HTML code. If the locators are different, then a Longest Common Subsequence (LCS) algorithms is applied between "passed element Xpath" and "failed page source" to determine the recommended new XPath for the element. Further, a new locator for the action step using the recommended XPath is applied, and additional attributes are verified for the same action step.

In an embodiment, the system may also be used to identify production errors. Let us assume that the software build was successfully executed using the test package, and no error was found. Further, during production, if the system detects an error, the system may identify that the error is a production error and not a feature change error or code error. In such case, the system may notify the user about the production error.

Figure 2:
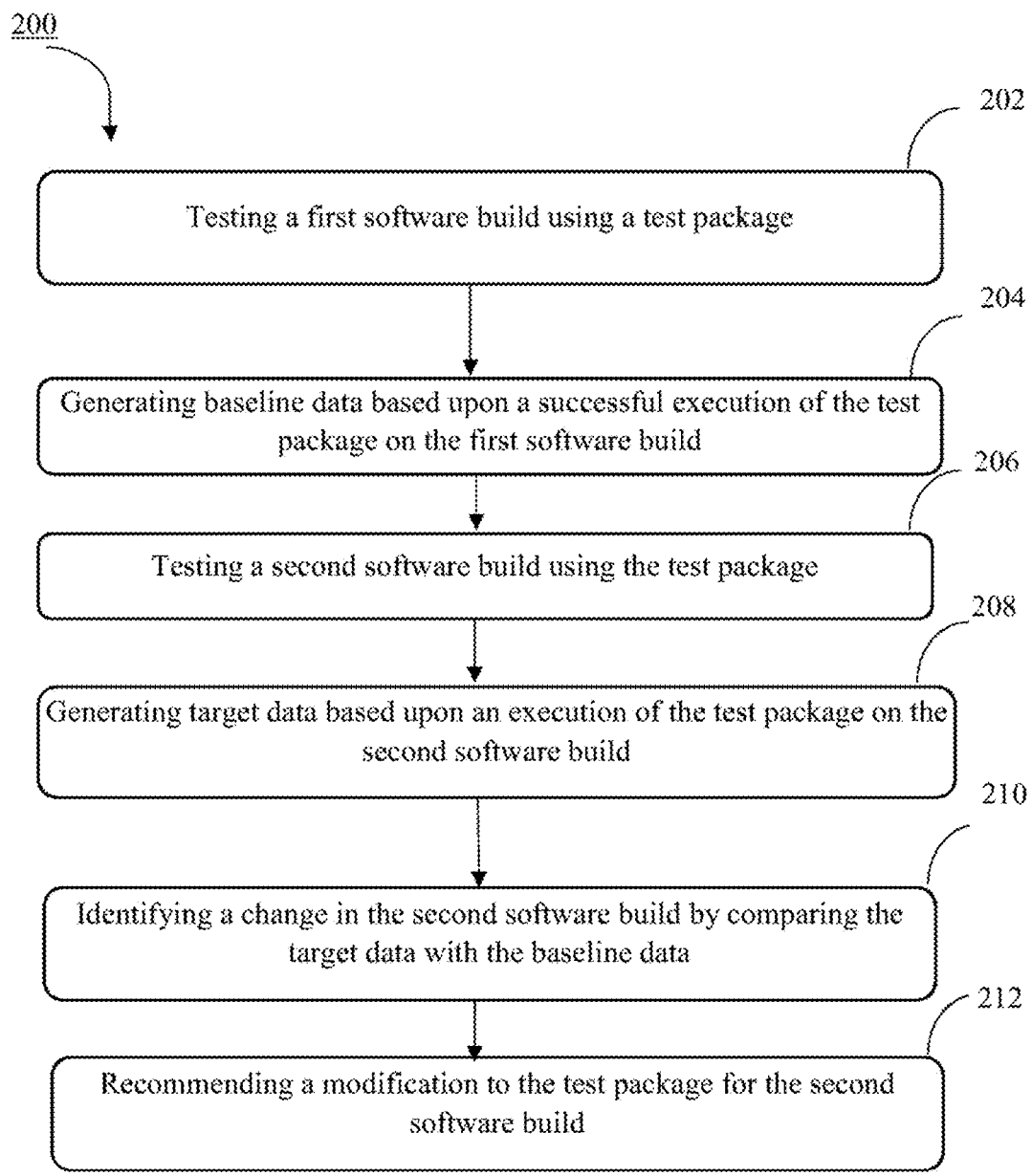
FIG. 2 illustrates a method for automatically testing software builds, in accordance with an embodiment of the present subject matter.

Referring now to FIG. 2, a method 200 for automatically testing software builds is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for automatically testing software builds. Additionally, individual blocks may be deleted from the method 200 without departing from the scope of the subject matter described herein. Furthermore, the method 200 for automatically testing software builds can be implemented in any suitable hardware, software, firmware, or combination thereof. However, for ease of explanation, in the embodiments described below, the method 200 may be considered to be implemented in the above-described system 102.

At block 202, a first software build may be tested using a test package. The test package may comprise at least a test strategy, a test case, a test model, an automation test script, a crowdsource script, and a manual test script.

At block 204, baseline data may be generated based upon a successful execution of the test package on the first software build. The baseline data may be generated when the test package is executed for action steps of the first software build. The baseline data may comprise, but not limited to, one or more screenshots, Uniform Resource Locators (URLs), test steps, test validation points, test summary, locators, console logs, Hypertext Markup Language (HTML) code, and automation logs.

At block 206, a second software build may be tested using the test package. It may be noted that the test package used for testing the first software build and the second software build are the same. Further, the second software build is modified version of the first software build.

At block 208, target data may be generated based upon an execution of the test package on the second software build. The target data may be generated when the test package is executed for action steps of the second software build. The target data may comprise, but not limited to, one or more screenshots, Uniform Resource Locators (URLs), test steps, test validation points, test summary, locators, console logs, Hypertext Markup Language (HTML) code, and automation logs.

At block 210, a change in the second software build may be identified by comparing the target data with the baseline data. The change may be identified when the target data and the baseline data mismatch.

At block 212, a modification to the test package may be recommended for the second software build. The modification may comprise at least adding a new test case and an associated new automation test script, updating the test case and the automation script, regenerating a modified test package as a result of the feature change, and removing one or more test cases and associated automation scripts from the test package based on the identified change.

Figure 3:
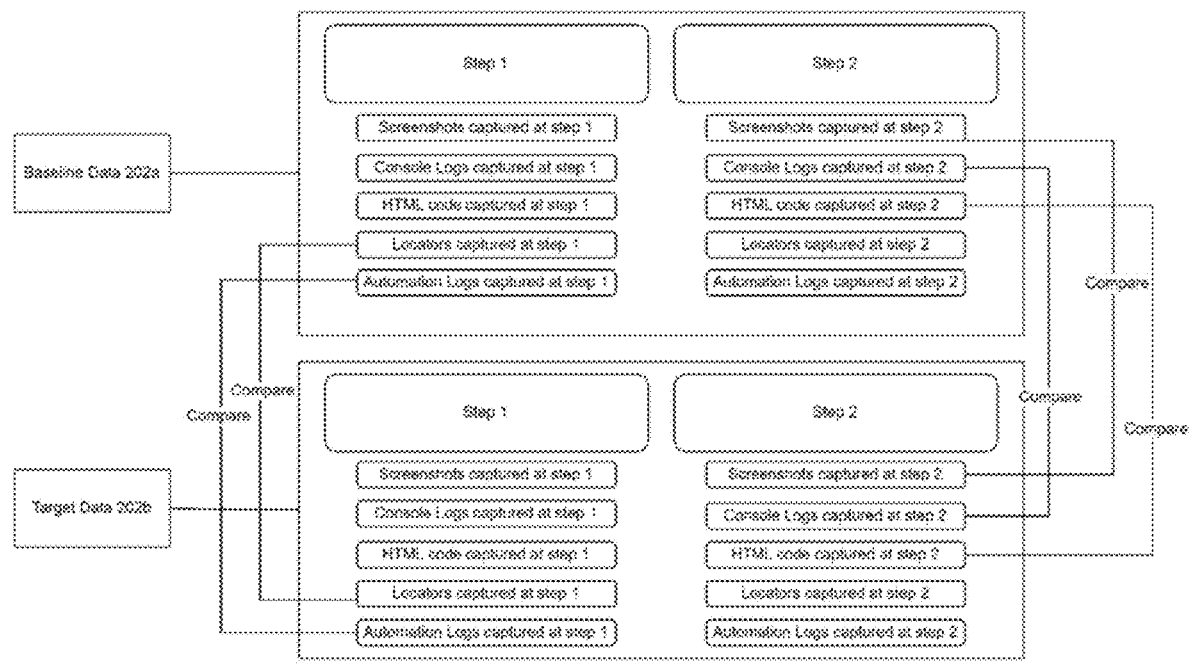
FIG. 3 illustrates an example of automatically testing software builds, in accordance with an embodiment of the present subject matter.

Referring to FIG. 3, an example of automatically testing software builds is illustrated. In FIG. 3, the test package comprises a test case and associated automation scripts with two steps (step 1 and step 2). The system generates the baseline data 202 upon successful execution of the test package on the first software build. Let us assume that the baseline data 202a is generated or captured in the month of January. After the execution of step 1, the system captures screenshots, locators, automation logs, and console logs. Similarly, after execution of the step 2, the system captures attributes such as screenshots, locators, automation logs, HTML code, and console logs. It may be noted that the attributes captured after the successful execution of the test package on the first software build are referred to as the baseline data 202a. The baseline data 202a is generated or captured for ideal scenarios or happy day scenario.

Further, let us assume that in the month of June, the software developer updates the first software build by modifying at least a feature and user interface. Furthermore, the system generates target data 202b based upon an execution of the test package on the second software build. It may be noted that the test package comprises a test case and associated automation scripts with two steps (step 1 and step 2). After execution, the generated or captured target data comprises the screenshots, the locators, the automation logs, HTML code and the console logs captured after the execution of the test package on the second software build. It may be noted that the software developer updated the first software build; thus, the same test package may not be appropriate for testing the second software build. The test package may require some modification as per the changes made to the first software build. In order to do so, the system compares the output obtained after executing the test package on the first software build and the second software build. In other words, the system compares the baseline data with the target data to identify a change in the second software build. The change is identified when the target data and the baseline data mismatch. Finally, the system recommends a modification to the test package for the second software build. The modification comprises at least adding a new test case and an associated new automation test script, updating the test case and the automation script, and removing one or more test cases and associated automation scripts from the test package based on the identified change.

In the above example, let us assume that the second software build comprises a new feature when compared to the first software build. In such cases the system may recommend one or more test cases addition in the test package to the user.

Figure 4:
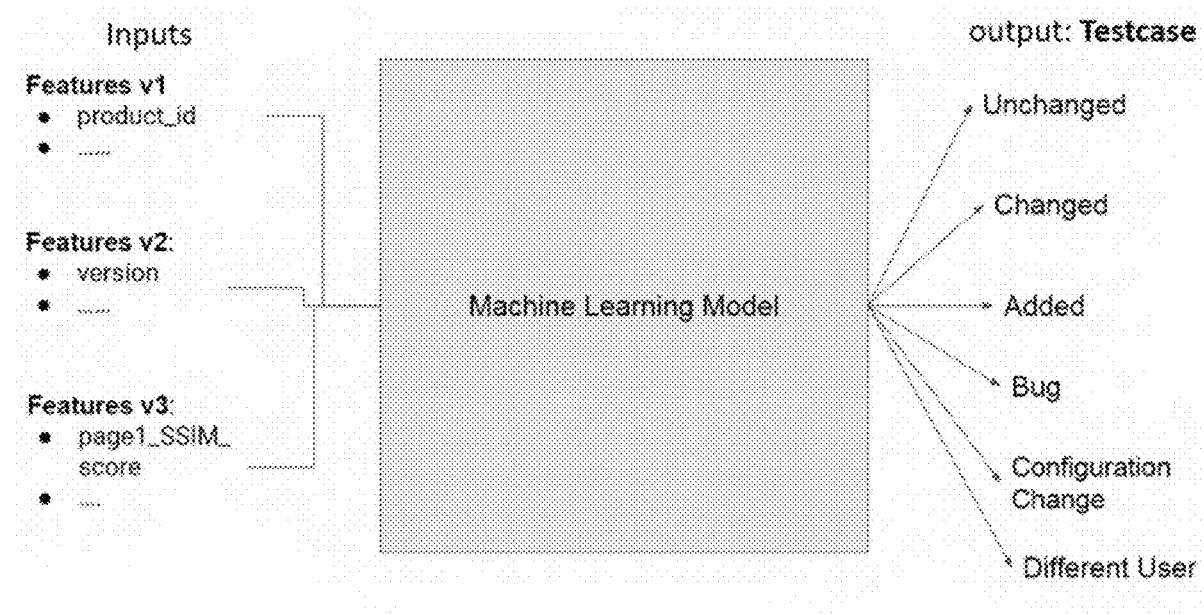
FIG. 4 illustrates a test case prediction model, in accordance with an embodiment of the present subject matter.

Referring to FIG. 4, an example of a test case prediction model is illustrated. The test case prediction model is a machine learning-based model which is continuously trained by providing one or more versions of a feature of the software. The one or more versions of the feature may comprise product identification number, version, and structural similarity index measure (SSIM). The machine learning-based model is used to predict the test case for the feature. It may be noted that the model predicts whether the feature is changed, unchanged, or newly added. Further, the model also identifies at least when a bug is identified, and a configuration is changed. Furthermore, the model also identifies type of a user (Different user). The user may be an admin. a customer, a salesperson, UI (User Interface), UX (User Experience) team, and alike. Based on the type of the user the screen or layout may have additional information comprising at least different buttons, different features, and alike.

Exemplary embodiments discussed above may provide certain advantages. Though not required to practice aspects of the disclosure, these advantages may include those provided by the following features.

Some embodiments of the system and the method enables recommending a modification to the test package in real-time without any human intervention.

Some embodiments of the system and the method reduce the time required for regression testing.

Some embodiments of the system and the method helps to determine an impact when a modification to a test package is implemented.

Some embodiments of the system and the method reduce time of a software tester to detect modification to a test package for software.

Some embodiments of the system and the method for testing software builds is provided according to specific attributes of the second software build.

Some embodiments of the system and the method enables identifying production errors when there is no error due to feature change in the software build.

Although implementations for methods and system for automatically testing software builds have been described in language specific to structural features and/or methods, it is to be understood that the appended claims are not necessarily limited to the specific features or methods described. Rather, the specific features and methods are disclosed as examples of implementations for automatically testing software builds.

The invention claimed is:

1. A system for automatically testing software builds, the system comprises:
   a memory; and
   a processor coupled to the memory, wherein the processor is configured to execute program instructions stored in the memory for:
   testing a first software build using a test package, wherein the test package comprises at least a test strategy, a test case, a test model, an automation test script, a crowdsource script, and a manual test script;
   generating baseline data based upon a successful execution of the test package on the first software build, wherein the baseline data is generated when the test package is executed for action steps of the first software build, and wherein the baseline data comprises one or more screenshots, Uniform Resource Locators (URLs), test steps, test validation points, test summary, locators, console logs, Hypertext Markup Language (HTML) code, and automation logs;
   testing a second software build using the test package;
   generating target data based upon an execution of the test package on the second software build, wherein the target data is generated when the test package is executed for action steps of the second software build, and wherein the target data comprises one or more screenshots, Uniform Resource Locators (URLs), test steps, test validation points, test summary, locators, console logs, Hypertext Markup Language (HTML) code, and automation logs;
   identifying a change in the second software build by comparing the target data with the baseline data, wherein the change is identified when the target data and the baseline data mismatch; and
   recommending a modification to the test package for the second software build, wherein the modification comprises at least adding a new test case and an associated new automation test script, updating the test case and the automation script, regenerating a modified test package as a result of the feature change, and removing one or more test cases and associated automation scripts from the test package based on the identified change.

2. The system as claimed in claim 1, wherein the modification to the test package is recommended using Artificial Intelligence (AI) techniques and Natural Language Processing (NLP).

3. The system as claimed in claim 1, wherein the target data is generated when the test package execution fails for the second software build.

4. The system as claimed in claim 1, further comprises identifying a timeout error when the locators present in the first software build are identical to the locators present in the second software build.

5. The system as claimed in claim 1, further comprises generating a new locator for the second software build by comparing an HTML code of the first software build with an HTML code of the second software build.

6. The system as claimed in claim 1, wherein comparing the target data with the baseline data to identify the change in the second software build, further comprises:
   comparing the one or more screenshots captured during the execution of the test package on the first software build with the one or more screenshots captured during the execution of the test package on the second software build using an Artificial Intelligence (AI) enabled image processing techniques and neural network model;
   comparing the locators of the first software build with the locators of the second software build to identify a change in one or more locators of the second software build using AI-enabled tracing tools, and
   comparing the console logs of the first software build with the console logs of the second software build to identify a change in one or more console logs of the second software build using Natural Language Processing (NLP) techniques; and
   comparing the automation logs of the first software build with the automation logs of the second software build to identify a change in the automation logs of the second software build using the NLP techniques.

7. The system as claimed in claim 1, wherein an action step is configured to receive a user action on the software.

8. A method for automatically testing software builds, the method comprises:
   testing, by a processor, a first software build using a test package, wherein the test package comprises at least a test strategy, a test case, a test model, an automation test script, a crowdsource script, and a manual test script;
   generating, by the processor, baseline data based upon a successful execution of the test package on the first software build, wherein the baseline data is generated when the test package is executed for action steps of the first software build, and wherein the baseline data comprises one or more screenshots, Uniform Resource Locators (URLs), test steps, test validation points, test summary, locators, console logs, Hypertext Markup Language (HTML) code, and automation logs;
   testing, by the processor, a second software build using the test package;
   generating, by the processor, target data based upon an execution of the test package on the second software build, wherein the target data is generated when the test package is executed for action steps of the second software build, and wherein the target data comprises one or more screenshots, Uniform Resource Locators (URLs), test steps, test validation points, test summary, locators, console logs, Hypertext Markup Language (HTML) code, and automation logs;
   identifying, by the processor, a change in the second software build by comparing the target data with the baseline data, wherein the change is identified when the target data and the baseline data mismatch; and
   recommending, by the processor, a modification to the test package for the second software build, wherein the modification comprises at least adding a new test case and an associated new automation test script, updating the test case and the automation script, regenerating a modified test package as a result of the feature change, and removing one or more test cases and associated automation scripts from the test package based on the identified change.

9. The method as claimed in claim 8, wherein the modification to the test package is recommended using Artificial Intelligence (AI) techniques and Natural Language Processing (NLP).

10. The method as claimed in claim 8, wherein the target data is generated when the test package execution fails for the second software build.

11. The method as claimed in claim 8, further comprises identifying a timeout error when the locators present in the first software build are identical to the locators present in the second software build.

12. The method as claimed in claim 8, further comprises generating a new locator for the second software build by comparing an HTML code of the first software build with an HTML code of the second software build.

13. The method as claimed in claim 8, wherein comparing the target data with the baseline data to identify the change in the second software build, further comprises:
   comparing the one or more screenshots captured during the execution of the test package on the first software build with the one or more screenshots captured during the execution of the test package on the second software build using an Artificial Intelligence (AI) enabled image processing techniques and neural network model;
   comparing the locators of the first software build with the locators of the second software build to identify a change in one or more locators of the second software build using AI-enabled tracing tools, and
   comparing the console logs of the first software build with the console logs of the second software build to identify a change in one or more console logs of the second software build using Natural Language Processing (NLP) techniques; and
   comparing the automation logs of the first software build with the automation logs of the second software build to identify a change in the automation logs of the second software build using the NLP techniques.

14. The method as claimed in claim 8, wherein an action step is configured to receive a user action on the software.

15. A non-transitory computer program product having embodied thereon a computer program for automatically testing software builds, the computer program product storing instructions for:
   testing a first software build using a test package, wherein the test package comprises at least a test strategy, a test case, a test model, an automation test script, a crowdsource script, and a manual test script;
   generating baseline data based upon a successful execution of the test package on the first software build, wherein the baseline data is generated when the test package is executed for action steps of the first software build, and wherein the baseline data comprises one or more screenshots, Uniform Resource Locators (URLs), test steps, test validation points, test summary, locators, console logs, Hypertext Markup Language (HTML) code, and automation logs;
   testing a second software build using the test package;
   generating target data based upon an execution of the test package on the second software build, wherein the target data is generated when the test package is executed for action steps of the second software build, and wherein the target data comprises one or more screenshots, Uniform Resource Locators (URLs), test steps, test validation points, test summary, locators, console logs, Hypertext Markup Language (HTML) code, and automation logs;
   identifying a change in the second software build by comparing the target data with the baseline data, wherein the change is identified when the target data and the baseline data mismatch; and
   recommending a modification to the test package for the second software build, wherein the modification comprises at least adding a new test case and an associated new automation test script, updating the test case and the automation script, regenerating a modified test package as a result of the feature change, and removing one or more test cases and associated automation scripts from the test package based on the identified change.

* * * * *